United States Patent
Niass et al.

(10) Patent No.: US 9,148,846 B2
(45) Date of Patent: Sep. 29, 2015

(54) METHODS FOR INTELLIGENT NETWORK SELECTION

(75) Inventors: Ibrahima Niass, Chicago, IL (US);
Trent J. Miller, West Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 418 days.

(21) Appl. No.: 13/173,708

(22) Filed: Jun. 30, 2011

(65) Prior Publication Data

US 2013/0005391 A1    Jan. 3, 2013

(51) Int. Cl.
*H04W 36/26* (2009.01)
*H04W 48/18* (2009.01)
*H04W 48/10* (2009.01)
*H04W 48/14* (2009.01)

(52) U.S. Cl.
CPC .............. *H04W 48/18* (2013.01); *H04W 48/10* (2013.01); *H04W 48/14* (2013.01)

(58) Field of Classification Search
CPC ............................... H04W 48/20; H04B 7/022
USPC ........................................................ 455/525
See application file for complete search history.

(56) References Cited

U.S. PATENT DOCUMENTS

| | | | | |
|---|---|---|---|---|
| 6,119,005 | A * | 9/2000 | Smolik ........................ | 455/436 |
| 6,360,264 | B1 * | 3/2002 | Rom ............................ | 709/227 |
| 6,421,735 | B1 * | 7/2002 | Jung et al. .................. | 709/250 |
| 6,532,491 | B1 * | 3/2003 | Lakis et al. ................. | 709/223 |
| 7,187,950 | B2 * | 3/2007 | Hintermeier et al. ....... | 455/565 |
| 7,433,929 | B2 * | 10/2008 | Guilford et al. ............. | 709/217 |
| 7,715,819 | B2 * | 5/2010 | Rockwell .................... | 455/404.1 |
| 7,865,089 | B2 * | 1/2011 | Andreoli et al. ............. | 399/8 |
| 7,894,823 | B2 * | 2/2011 | Alemany et al. ............ | 455/453 |
| 8,112,114 | B2 * | 2/2012 | Bubien, Jr. ................. | 455/556.1 |
| 8,145,210 | B2 * | 3/2012 | Thalanany et al. .......... | 455/432.1 |
| 8,160,613 | B2 * | 4/2012 | Handforth et al. .......... | 455/456.3 |
| 8,185,104 | B2 * | 5/2012 | Walker et al. ............... | 455/433 |
| 8,385,200 | B2 * | 2/2013 | Rainer et al. ............... | 370/232 |
| 8,472,948 | B2 * | 6/2013 | Pampu et al. ............... | 455/432.1 |
| 8,489,108 | B2 * | 7/2013 | Chan et al. .................. | 455/453 |
| 8,528,071 | B1 * | 9/2013 | Kwan ........................... | 726/14 |
| 8,559,955 | B2 * | 10/2013 | Handforth et al. .......... | 455/436 |

(Continued)

FOREIGN PATENT DOCUMENTS

| EP | 1527560 B1 | 8/2007 |
|---|---|---|
| EP | 1826953 A1 | 8/2007 |

(Continued)

OTHER PUBLICATIONS

"Generation Partnership Project; Technical Specification Group Services and System Aspects; service Accessibility" 3GPP TS 22.011; Jun. 201; Section 4.3.1.

(Continued)

*Primary Examiner* — Hai V Nguyen
(74) *Attorney, Agent, or Firm* — Steven A. May

(57) ABSTRACT

A method for intelligent network selection includes collecting, by a subscriber unit or an infrastructure device network state condition information for a plurality of networks when the subscriber unit is currently attached to a first access network. Upon detection of a trigger, the subscriber unit or the infrastructure device selects a second access network using the network station condition information. The subscriber unit detaches from the first access network and attaches to the second access network.

18 Claims, 5 Drawing Sheets

(56) References Cited

U.S. PATENT DOCUMENTS

| | | | |
|---|---|---|---|
| 8,621,656 B2* | 12/2013 | Miettinen et al. | 726/34 |
| 8,688,144 B1* | 4/2014 | Alexander | 455/456.3 |
| 8,724,456 B1* | 5/2014 | Hong et al. | 370/225 |
| 8,767,672 B2* | 7/2014 | Soomro et al. | 370/331 |
| 8,824,322 B2* | 9/2014 | Osterling et al. | 370/252 |
| 2002/0087674 A1* | 7/2002 | Guilford et al. | 709/223 |
| 2002/0187749 A1* | 12/2002 | Beasley et al. | 455/41 |
| 2003/0009541 A1* | 1/2003 | Sato | 709/220 |
| 2003/0017838 A1* | 1/2003 | Kayama et al. | 455/525 |
| 2004/0005878 A1* | 1/2004 | Olin et al. | 455/414.1 |
| 2004/0097234 A1* | 5/2004 | Rajkotia et al. | 455/442 |
| 2004/0210622 A1* | 10/2004 | Stein et al. | 709/200 |
| 2004/0246922 A1* | 12/2004 | Ruan et al. | 370/331 |
| 2004/0266474 A1* | 12/2004 | Petrus | 455/525 |
| 2005/0009530 A1* | 1/2005 | Rouffet et al. | 455/452.1 |
| 2005/0048974 A1* | 3/2005 | Kim et al. | 455/436 |
| 2005/0128956 A1* | 6/2005 | Hsu et al. | 370/252 |
| 2005/0135310 A1* | 6/2005 | Cromer et al. | 370/331 |
| 2005/0136928 A1* | 6/2005 | Zaki | 455/436 |
| 2005/0227692 A1* | 10/2005 | Kawashima et al. | 455/435.2 |
| 2005/0271021 A1* | 12/2005 | Alemany et al. | 370/338 |
| 2006/0010487 A1* | 1/2006 | Fierer et al. | 726/34 |
| 2006/0030319 A1* | 2/2006 | Chou et al. | 455/435.1 |
| 2006/0084417 A1* | 4/2006 | Melpignano et al. | 455/418 |
| 2006/0245392 A1* | 11/2006 | Buckley et al. | 370/331 |
| 2006/0253555 A1* | 11/2006 | Leung | 709/220 |
| 2006/0268711 A1 | 11/2006 | Doradla et al. | |
| 2007/0147619 A1* | 6/2007 | Bellows et al. | 380/277 |
| 2007/0268509 A1* | 11/2007 | Andreoli et al. | 358/1.14 |
| 2008/0159232 A1* | 7/2008 | Thalanany et al. | 370/332 |
| 2009/0005041 A1 | 1/2009 | Steinberg | |
| 2009/0141694 A1* | 6/2009 | Shi | 370/338 |
| 2010/0016015 A1* | 1/2010 | Bubien, Jr. | 455/556.1 |
| 2010/0048205 A1 | 2/2010 | Guilford et al. | |
| 2010/0145161 A1 | 6/2010 | Niyato et al. | |
| 2010/0153955 A1* | 6/2010 | Sirota et al. | 718/102 |
| 2010/0188992 A1* | 7/2010 | Raleigh | 370/252 |
| 2010/0208694 A1* | 8/2010 | Kumai et al. | 370/331 |
| 2011/0069638 A1* | 3/2011 | Ishizu et al. | 370/254 |
| 2011/0151886 A1* | 6/2011 | Grayson et al. | 455/452.1 |
| 2012/0030275 A1* | 2/2012 | Boller et al. | 709/203 |
| 2012/0059748 A1* | 3/2012 | Matsuo et al. | 705/34 |
| 2012/0258717 A1* | 10/2012 | Handforth et al. | 455/436 |
| 2013/0250768 A1* | 9/2013 | Raleigh | 370/235 |
| 2013/0295940 A1* | 11/2013 | Chan et al. | 455/437 |
| 2014/0053198 A1* | 2/2014 | Sirpal et al. | 725/43 |
| 2014/0113583 A1* | 4/2014 | Raleigh | 455/405 |
| 2014/0220934 A1* | 8/2014 | Zhang et al. | 455/410 |

FOREIGN PATENT DOCUMENTS

| | | |
|---|---|---|
| EP | 2237610 A1 * | 10/2010 |
| WO | 2005084362 A2 | 9/2005 |
| WO | 2009156554 A1 | 12/2009 |

OTHER PUBLICATIONS

"Generation Partnership Project; Technical Specification Group Services and System Aspects; service Accessibility" 3GPP TS 22.011; Jun. 201; Section 4.3.2.

"Wideband Air Interface-Mobility Management Layer Specification Public Safety Wideband Data Standards Project Digital Radio Technical Standards," TIA Standard 902.BAAF; Nov. 28, 2007.

"Media Independent Handover Services," IEEE 802.21 standard: Nov. 2008.

International Search Report and Written Opinion International Patent Application No. PCT/US2012044258 issued on Sep. 25, 2012.

3GPP TS 31.102 V3.18.0 (Jun. 2005) 3rd Generation Partnership Project; Technical Specification Group Core Network and Terminals; Characteristics of the USIM application (Release 1999), Sections 4.2.53 and 4.2.54, pp. 54-55, Retrieved from the Internet URL: http://www.arib.orjp/IMT-2000N720Mar09/5__Appendix/R99/31/31102-3i0.pdf on Dec. 31, 2014.

Singh, R.K. et al., "Vertical Handoffs in Fourth Generation Wireless Networks," International Journal of Soft Computing and Engineering (IJSCE), vol. 2, Issue 2, May 2012, pp. 481-490.

First Office Action mailed Oct. 27, 2014 in corresponding Mexican Patent Application No. MX/a/2013/015261.

Patent Examination Report No. 1 mailed Nov. 10, 2014 in corresponding Australian Patent Application No. 2012275493.

* cited by examiner

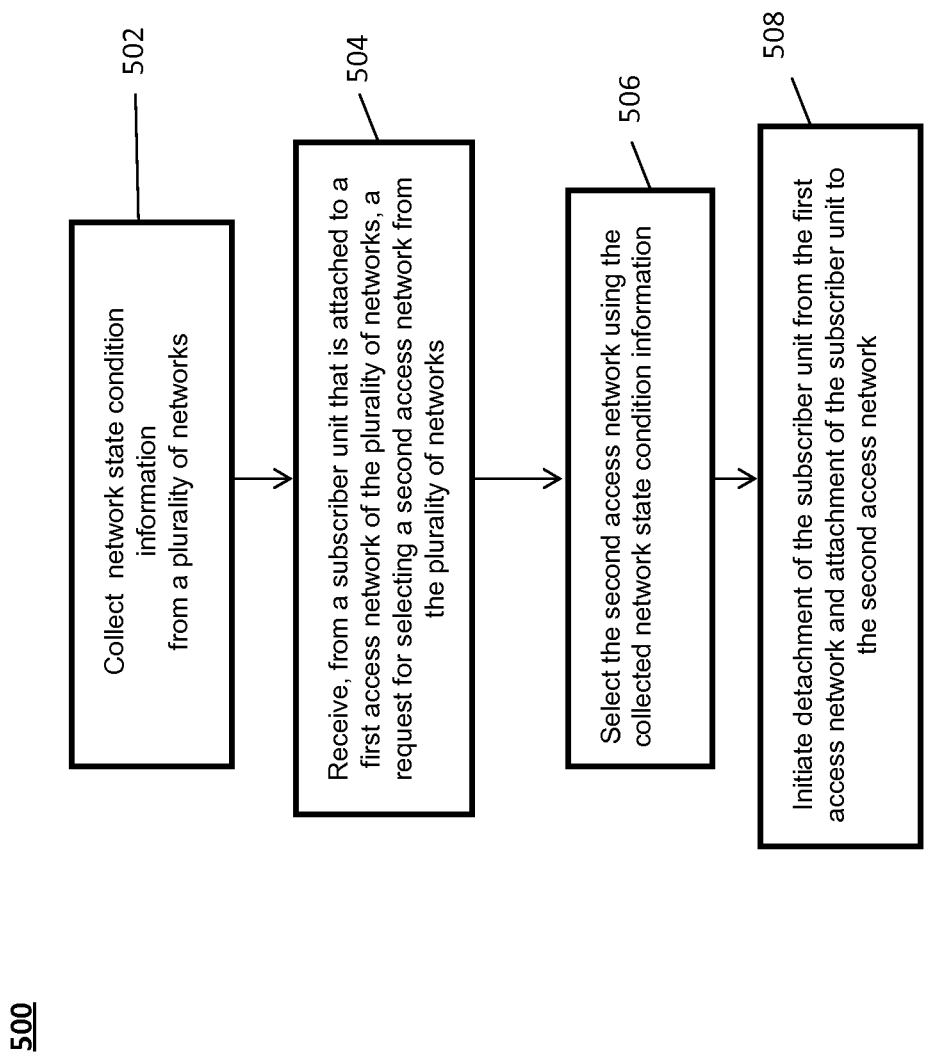

METHODS FOR INTELLIGENT NETWORK SELECTION

TECHNICAL FIELD

The present disclosure relates generally to communication systems and in particular to methods for intelligent network selection that includes collecting network state condition information from a plurality of target networks prior to attachment to a new network.

BACKGROUND

Recently, as trends in telecommunications rapidly move from analog toward broadband operations, the variety of and speed by which features are offered by mobile telecommunication devices continues to significantly improve. The demands placed on today's mobile devices often require total performance with minimal latency while establishing multimedia communications sessions, instant messaging, file transfer, and push to talk sessions for law enforcement and public safety applications among others.

It is desired that broadband public safety devices support multiple access networks simultaneously such as, among others, Long Term Evolution (LTE) systems, Wireless Local Area Network (WLAN) systems, Code Division Multiple Access (CDMA) systems, etc. In one particular example, LTE provides end-to end Internet Protocol (IP) service delivery of media to mobile telephone networks and is quickly emerging as the preferred standard for radio technologies within the United States for commercial carriers as well as public safety, security, and defense agencies alike.

Illustratively, in the area of public safety, security, and defense, it is often vital to quickly move first responders that perform a wide range of mission critical operations to a particular incident across a variety of radio access networks to the locale of the incident. However, while exposed to a variety of radio access network systems, many times the User Equipment (UE) assigned to each responder encounters discrepancies in network service that often unacceptably compromises the responder's ability to conduct mission critical operations with minimal latency. For example, often a UE device will appear to the responder as if device operations are stalled or "hanging" while the device searches for a suitable radio access network for service attachment.

Unfortunately, current UE devices are commonly equipped with predetermined static configurations for attaching to subsequent radio access networks that fail to identify the current overall status of that targeted radio access network, including for example such factors as if a target network for future attachment is overloaded, impaired, or will ultimately reject the UE device as having insufficient admission priority. In this disclosure and appended claims the term "target network" means a neighboring candidate network for possible attachment by a UE device upon detachment from its active access network.

More particularly, 3GPP (3rd Generation Partnership Project) specification 31.102 in sections 4.2.53 and 4.2.54 defines behaviors of a USIM application for mobile devices (user equipment). For example, the document contains options for attachment priority; either manual (end-user selection) or automatic (attachment selected by device) which use a "PLMN selector with Access Technology". For automatic attachment selection, the USIM contains a prioritized list of PLMN ID (public land mobile network identifier) with a radio access technology identifier (e.g. E-UTRAN, cdma200 HRPD, GSM, etc.). The device iterates through the list, attempting to attach to each access network and locate an access network supporting its preferred core network, which is identified by the PLMN ID. Such a method is an efficient and not suited to certain implementation scenarios, such as in the realm of public safety and mission critical applications.

Thus, there exists a need for methods for intelligent network selection that address shortcomings of network selection based on predetermined static configuration.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

FIG. 5 is a flow diagram illustrating a method performed by an infrastructure device for intelligent network selection from a plurality of networks, in accordance with an embodiment.

Figure 1:
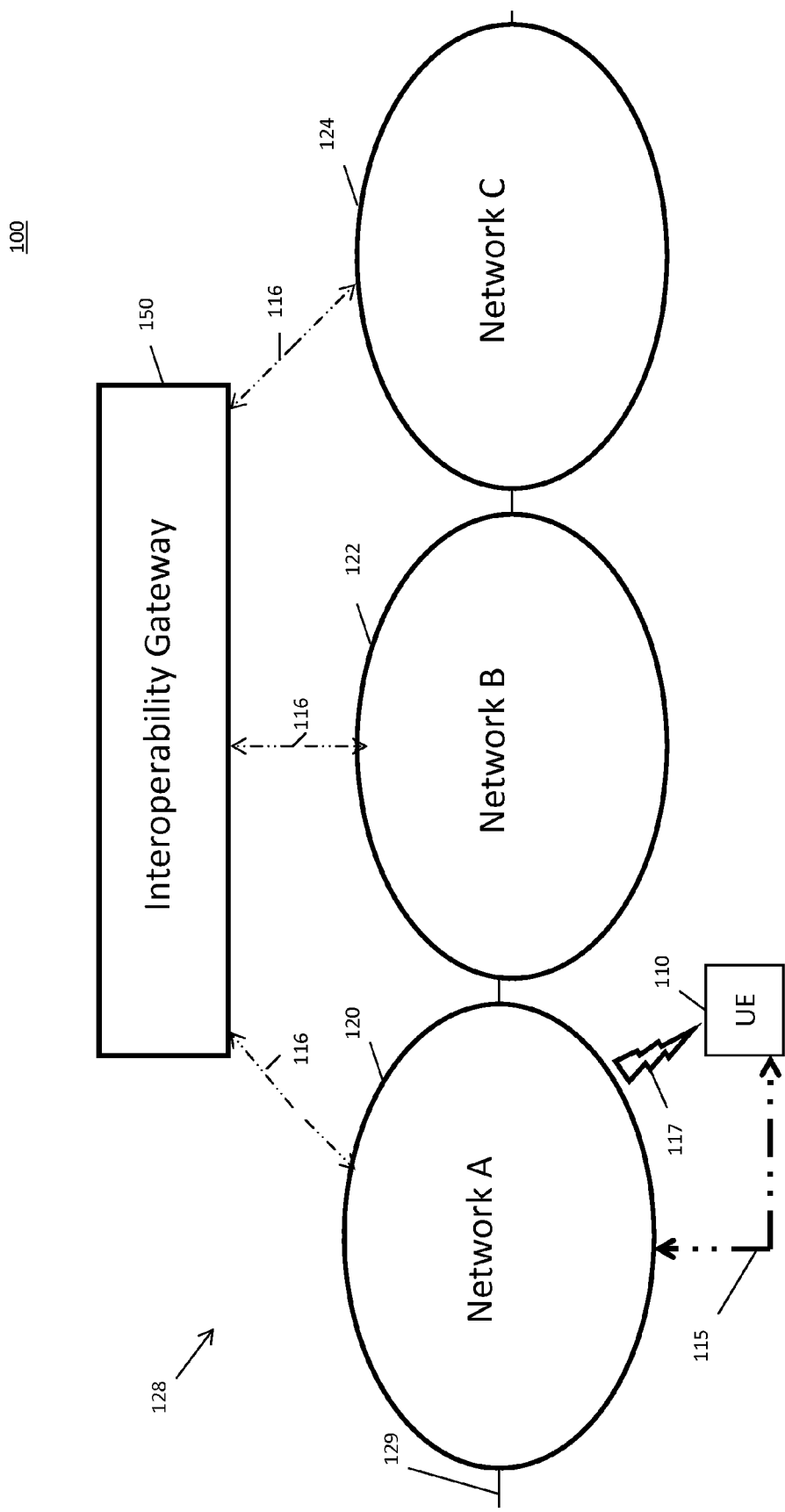
FIG. 1 is a system diagram of a communication system that implements methods for intelligent network selection in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides methods for intelligent network selection from a plurality of networks. A subscriber unit operates while attached to at least a first access network and performs the following. The subscriber unit receives network state condition information for a set of target networks from the plurality of networks and a trigger for selecting a second access network from the plurality of networks. The subscriber unit selects the second access network from the plurality of networks using the network state condition information and detaches from the first access network and attaches to the second access network.

Moreover, an infrastructure device coupled to a plurality of networks implements the method for intelligent network selection from the plurality of networks generally as follows. The infrastructure device collects network state condition information from the plurality of networks and receives, from a subscriber unit that is attached to a first access network of the plurality of networks, a request for selecting a second access network from the plurality of networks. The infrastructure device selects the second access network using the collected network state condition information and initiates both detachment from the first access unit and attachment to the second access network of the subscriber unit. Those skilled in the art will realize that the above recognized advantages and other advantages described herein are merely illustrative and are not meant to be a complete rendering of all of the advantages of the various embodiments.

Referring now to the drawings, and in particular FIG. 1, a communication system for intelligent network selection in accordance with some embodiments is shown and indicated generally at 100. The communication system 100 includes a plurality of networks 128 shown as Network A 120, Network B 122, and Network C 124, an interoperability gateway 150, and at least one subscriber unit (shown as a user equipment (UE)) 110. Each of the networks 120, 122, and 124 includes a number of infrastructure devices for facilitating communications for the subscriber units operating in the system. Such infrastructure devices include elements of a radio access network (RAN) or simply access network that communicate with the subscriber units via an air interface, such as for instance, eNodeBs, base radios, base stations, base transceiver stations, and the like. Such infrastructure devices further include elements of an infrastructure core (e.g., an Evolved Packet Core (EPC) in an LTE system) used to manage the allocation of radio resources of the network, with the infrastructure core including elements such as for instance, Mobility Management Entities, Signaling Gateways, Packet Data Network Gateways, etc. Other infrastructure devices that may be included in any one or each of the networks 120, 122, 124 includes, but are not limited to, switches, zone controllers, base station controllers, repeaters, access points, routers, etc.

In an embodiment, at least one network of the plurality of networks 128 comprises a LTE-based network. Illustratively, for the embodiment of FIG. 1, Network A 120 comprises a private LTE system, illustratively a home public safety LTE system; Network B 122 comprises a private LTE system, illustratively a neighboring public safety LTE system; and Network C 124 comprises a public LTE system, illustratively a commercial carrier mobile phone LTE system. However, the plurality of networks can comprise any combination of 3GPP (3$^{rd}$ Generation Partnership Project), broadband, legacy or non-3GPP radio access type systems including, but not limited to LTE systems, Wireless Local Area Network (WLAN) systems, and Code Division Multiple Access (CDMA) systems, GPRS (general packet radio service) systems, Land Mobile Radio (LMR) systems, and WiMAX (Worldwide Interoperability for Microwave Access) systems.

The subscriber unit 110 operates to send and receive communication information while attached to an access network, shown in FIG. 1 as Network A 120, wherein the network attachment of subscriber unit 110 to Network A 120 is indicated at 117. The network, in this case Network A 120, to which a subscriber unit is attached is termed herein as an "active network". All other networks within the system, in this case Network B 122 and Network C 124, are termed herein as "neighboring networks". A network to which the subscriber unit can potentially attach in the future is termed herein as a "target network".

Subscriber units are also commonly referred to in the art as wireless devices, communication devices, mobile devices, wireless mobile devices, UE, access devices, access terminals, mobile stations, mobile subscriber units, mobile devices, user devices, and the like. Subscriber units, can be any type of communication device such as radios, mobile phones, mobile data terminals, Personal Digital Assistants (PDAs), laptops, two-way radios, cell phones, or any other device capable of operating in a wired or wireless environment and that can be used by public users (such as consumers) or private users (such as public safety users). Further, a "subscriber", "member", "member of a group", and "user" are used interchangeably and refer to a user of at least one subscriber unit, such as the police officer in the above illustration having a mobile police phone in hand and a fire & rescue LMR radio at the waist, whereas described herein, the terms "subscriber unit", "user equipment", "mobile unit", "UE" device, and "mobile device" are used interchangeably.

The interoperability gateway 150 is a generic term for an infrastructure device that interfaces with multiple networks in the system 100 to facilitate at least one embodiment of the teachings herein by, at a minimum, collecting network state condition information for at least some of the networks in the system 100. As shown in FIG. 1, the interoperability gateway 150 is layered to sit above a network layer 129 that includes Network A 120, Network B 122 and Network C 124. Gateway network link 116 indicates the interoperability gateway 150 is linked to each of Networks A, B, and C.

Figure 3:
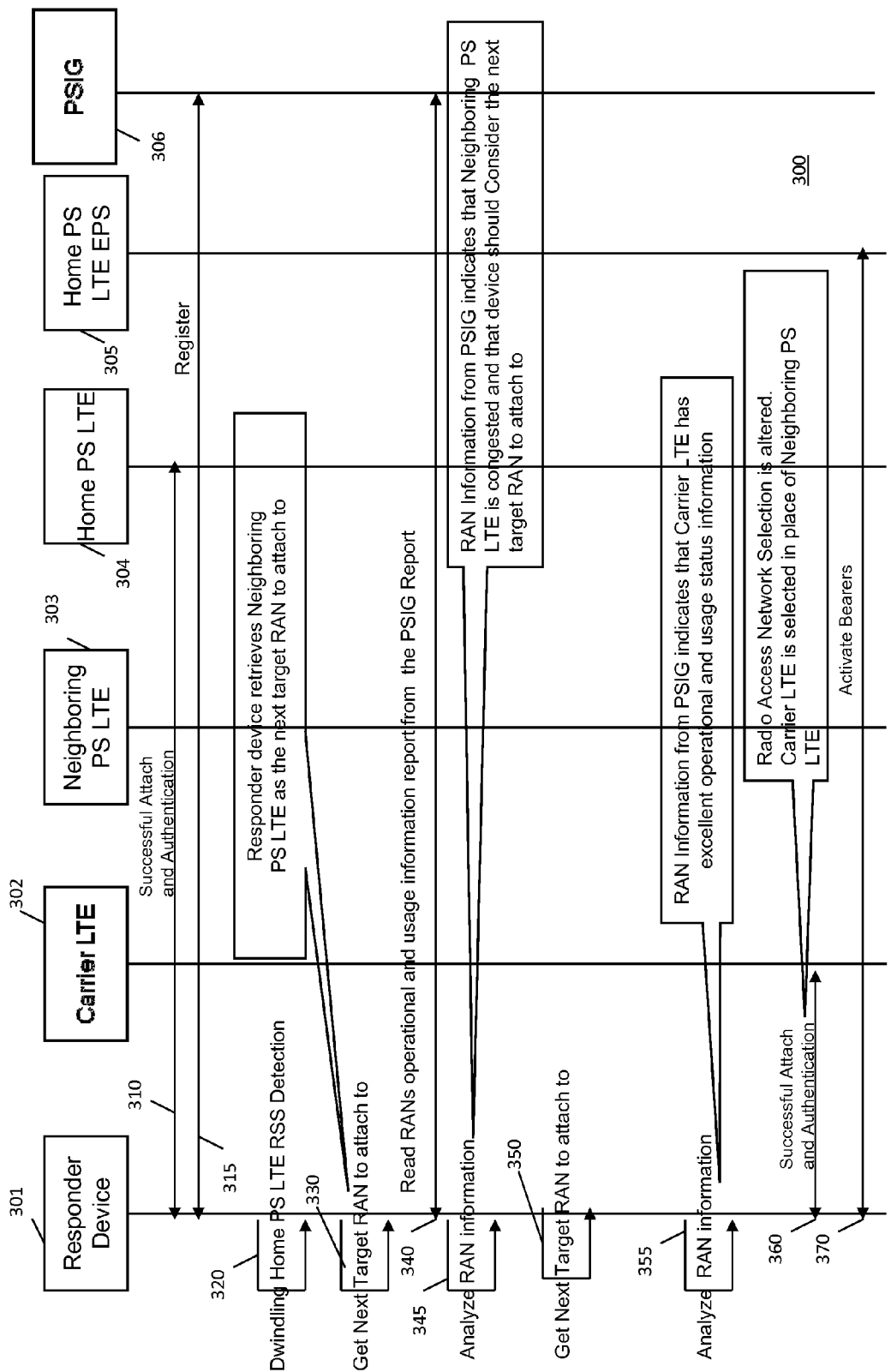
FIG. 3 is a sequence diagram showing an illustrative method for intelligent network selection, in accordance with an embodiment, where an interoperability gateway collects network state condition information for use in selecting an optimal access network for attachment thereto of a subscriber unit.
Figure 4:
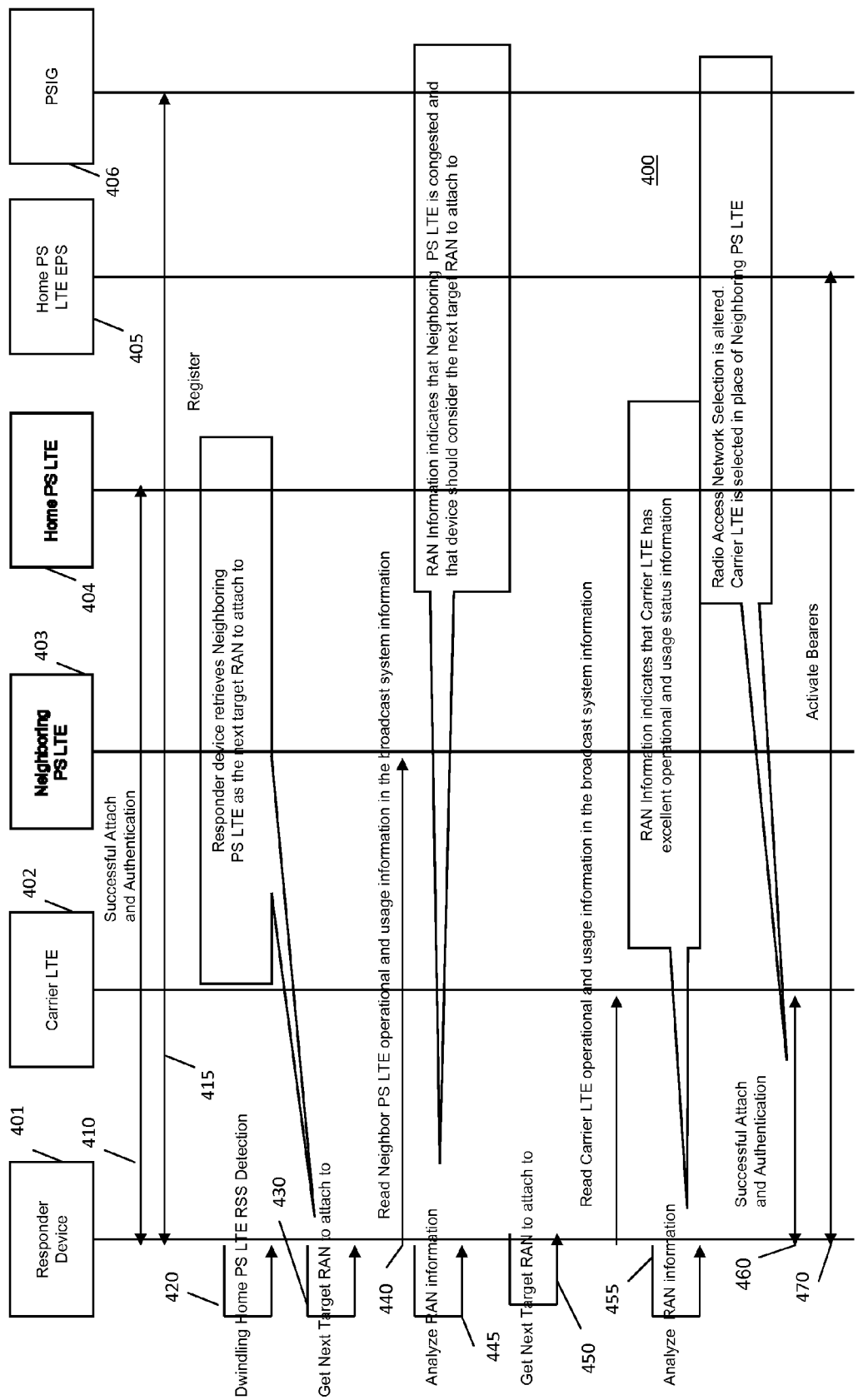
FIG. 4 is a sequence diagram showing another illustrative method for intelligent network selection, in accordance with an embodiment, where a subscriber unit collects network state condition information for use in selecting an optimal access network for attachment thereto of the subscriber unit.

For purposes of illustration, the interoperability gateway 150 comprises a Public Safety Interoperability Gateway (PSIG) as shown in FIGS. 3-4. In operation, the PSIG links communication systems to facilitate immediate communication among subscriber units 110 despite what particular network within the network layer 129 that each subscriber unit 110 is attached to. Illustratively, a PSIG facilitates immediate and continuous communication between first responders in a mission critical situation whereby Network A 120 is a fire & rescue LTE network, Network B 122 is a military band LTE network, and Network C 124 is a commercial carrier mobile phone LTE system.

In general, the UE 110, interoperability gateway 150, and infrastructure devices of Networks A, B, and C of system 100 are implemented using one or more (although not shown) memory devices, network interfaces, and processing devices that are operatively coupled, and which when programmed form the means for these system elements to implement their desired functionality, for example, as illustrated by reference to the methods and message sequence diagrams shown in FIGS. 2-5. The processing device utilized by the elements of system 100 may be partially implemented in hardware and, thereby, programmed with software or firmware logic or code for performing functionality described by reference to FIGS. 2-5; and/or the processing device may be completely implemented in hardware, for example, as a state machine or ASIC (application specific integrated circuit). The memory implemented by these system elements can include short-term and/or long-term storage of various information needed for the functioning of the respective elements. The memory may further store the software or firmware for programming the processing device with the logic or code needed to perform its functionality.

Figure 2:
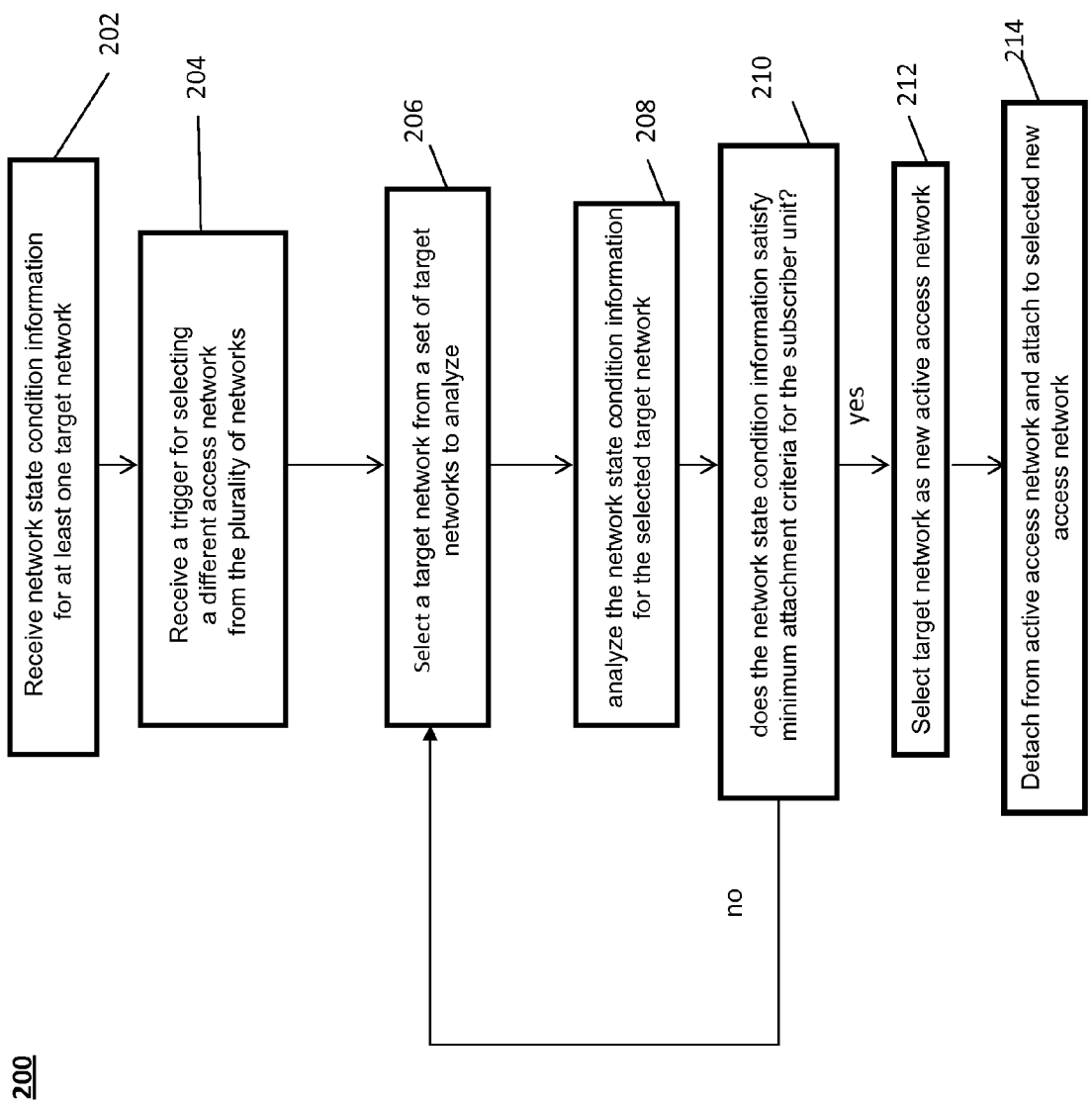
FIG. 2 is a flow diagram illustrating a method performed by a subscriber unit for intelligent network selection from a plurality of networks, in accordance with an embodiment.

We now turn to a detailed description of the functionality of the system 100 elements in accordance with the teachings herein and by reference to the remaining figures. Referring now to FIG. 2, a flow diagram illustrating a general method 200 performed by a subscriber unit (e.g., the subscriber unit 110) for intelligent network selection from a plurality of networks, in accordance with an embodiment. More particularly, the subscriber unit 110 performs method 200 while being attached to one of the networks in system 100, in this case to Network A 120. As used herein, the term "attached" means that at a minimum the subscriber unit has an air interface connection with a RAN element in Network A and a connection with an element in the infrastructure core, such as a Non Access Stratum (NAS) connection with an MME in the EPC, where the Network A is an LTE network.

While being attached to Network A, the subscriber unit 110 receives, at 202, network state condition information for a set of target networks from the plurality of networks in system 100. Network state condition information for a network is defined herein as "real time" operation and usage information for the network that enables a determination to be made as to whether the network is a suitable network for a subscriber unit to attach, wherein the network state condition information is exclusive of (i.e., does not include) signal strength information such as Received Signal Strength Indication (RSSI) and the like. Real time, in this context, means that the information has been refreshed are updated within some maximum threshold window of time.

In an embodiment, the network state condition information for a network includes one or more of the following parameters administrative status, operational status, usage status, or admission priority. Administrative status means a status or "Quality of Service" of a network means the to ability of a network to consistently provide predetermined attributes to data flow within the network, such as the ability of a network to consistently provide one or more of: bit rate, delay, jitter, packet dropping probability or bit error rates attributes within a network.

In one illustrative embodiment, the subscriber unit 110 receives the network state condition information from an infrastructure device that collects the network state condition information from the networks within system 100. For example, the subscriber unit 110 receives, from the interoperability gateway 150, network state condition information for one or both of Network B and Network C. In such a case, the interoperability gateway 150 collects the network state condition information from the networks and may consolidate this information into a report, which it provides to the subscriber unit 110.

For instance, the interoperability gateway 150 receives the network state condition information from a RAN element or an element within the EPC core. RAN information can be collected using a direct reporting interface from the RAN itself (e.g., an LTE eNodeB reporting Interface). Tracking if the RAN has modified bandwidth/QoS or pre-empted bearers on cell(s) may be used as an indicator of network state condition information. In one illustrative implementation, interoperability gateway 150 has a database to know, given the subscriber unit 110 current cell location, which cells in the same access network or different access networks are in-range of the subscriber unit; and given the subscriber unit location, the interoperability gateway 150 could construct a customized report of operational and usage information and send it to the subscriber unit 110 using its current attached access network.

The report can take any suitable and useful form, an example of which is included below in Table 1 for illustrative purposes.

TABLE 1

| Radio Access Technology (RAT) | PLMN ID | Cell ID | Admin. Status | Oper. Status | Usage Status | Min. Unicast ARP | Min. Multicast ARP |
|---|---|---|---|---|---|---|---|
| E-UTRAN | plmn-Id1 | cell-Id1 | Unlocked | Enabled | 10% ARB | 5 | 5 |
| E-UTRAN | plmn-id2 | cell-Id2 | Unlocked | Enabled | 80% ARB | 3 | 4 |
| E-UTRAN | plmn-id3 | cell-Id3 | Unlocked | Enabled | Impaired | 2 | 2 | indication of whether an element (e.g., a cell meaning in one example a coverage area of an eNodeB) of the network has been locked or unlocked. Operational Status means a status or indication of whether an element of the network is enabled or disabled. Usage status means one or more metrics that indicate available resource within the network. The metrics used may include one or more of the following: % of available resource blocks, ARB, (e.g., the cell has 20% ARB); active (e.g., the cell is active); idle (e.g., the cell is idle); busy (e.g., the cell is busy); or impaired (e.g., the cell is impaired).

Admission priority means a minimum priority level needed for obtaining resources in the network. Examples of measurement or indication of admission priority include Minimum Unicast ARP (admission retention priority) meaning the minimum ARP necessary to admit a unicast bearer to the system, and Minimum Multicast ARP meaning the minimum ARP necessary to admit a multicast bearer to the system. Illustratively, Minimum ARP is an element of Quality of Service (QoS) provided in 3GPP Long-term Evolution, LTE.

The timing or frequency with which the subscriber unit 110 receives the network state condition information from the interoperability gateway 150 can be based on a number of factors. For example in one embodiment the interoperability gateway 150 periodically (based on some pre-established timing frequency) "pushes" the network state condition information to the subscriber unit 110, meaning that the interoperability Gateway 150 sends this information to the subscriber unit 110 without receiving a request for such information. In another example, the subscriber unit 110 requests the network state condition information from the interoperability gateway 150. For instance, the subscriber unit 110 requests such information "on demand" or "just-in-time" in response to receiving a trigger to select a different access network for attaching, or the subscriber unit 110 periodically requests or queries the interoperability gateway 1150 for the network state condition information.

In another embodiment, the subscriber unit 110 receives the network state condition information by, itself, collecting this information from the networks in the system 110. For instance, the subscriber unit 110 collects the network state condition information from advertisement messages broadcasted by one or more of the networks in the system 110, and can create its own report such as one illustrated above by reference to Table 1. In one illustrative implementation, the air interface of the potential or target access network is enhanced so that the radio access network itself advertises this information over-the-air on the broadcast channel. For LTE, these parameters could be transmitted as new AVP(s) in the MasterInformationBlock (BCH) or SystemInformationBlock*/SystemInformation or other downlink message.

Turning again to method 200, the subscriber unit 110, at 204, receives a trigger that indicates to the subscriber unit that a different access network should be selected to which the subscriber unit will attach. This trigger can take a number of forms. For instance, the subscriber unit may detect a weakening signal from the Network A, such as by detecting a change in signal strength for this access network. Other triggers can include, for example: a change in service cost(s), a change in security parameter(s), a reduction in resource(s) from the active access network, or a loss of resource(s) from the active access network. "Service costs" refer to monetary charges applied to a subscriber unit during operation within an active access network. For example, a public safety device on a first network leaves the first network and attaches to a nearby second network having superior signal strength. When the charges for carrier usage minutes, on the second network, exceeds a set monetary budget, this provides a trigger to the public safety device to return to the first network. "Security parameters" refer to the designated security configuration for a particular subscriber unit while operating within an access network. A trigger may be for example an expiration of the subscriber unit's security credentials for the active network without renewal.

Responsively, the subscriber unit 110 proceeds to perform a process to select a different access network, and uses the network state condition information to perform the selection process. In one illustrative example, the subscriber unit 110 performs functionality described by reference function blocks 206 to 212 to select the next access network to which it will attach. At 206, the subscriber unit 110 selects a first target network from a set of target networks to analyze. The set of target networks can include all neighboring networks within system 100 or, more likely just the portion of networks in system 100 to which the subscriber unit 110 is authorized to attach. In a particular illustrative implementation, subscriber unit 110 surveys the radio air interface and determines a list of available RANs. The subscriber unit 110 then uses a configuration (e.g., a list of preferred access networks) stored in the device to determine a preferred RAN to which to attach.

At 208, the subscriber unit 110 analyzes the networks condition information for the selected target network. At 210, the subscriber unit 110 decides whether the network state condition information satisfies minimum attachment criteria for the subscriber unit. Minimum attachment criteria means criteria that allows the device making the decision to determine whether the target network: can admit the subscriber unit's bearer request based on priority; has sufficient bandwidth and resources; and is not in an impaired state or otherwise unable to provide normal service. When the network state condition information for the target network satisfies the minimum attachment criteria, the subscriber unit 110, at 212, selects the target network as the next access network to which it will attach.

At 214, the subscriber unit 110, thereby, detaches from Network A and attaches to the selected access network. When the network state condition information for the target network fails to satisfy the minimum attachment criteria, the subscriber unit 110 returns to block 206 where it selects a next target network for analyzing. Using this selection process or algorithm, the device (in this case subscriber unit 110) can more efficiently (rapidly) and optimally select the next access network to which the subscriber unit 110 will attach without having to first go through the timely process of actually attaching to the target network. This allows the subscriber unit 110 to be more resilient to impaired and congested networks.

FIGS. 3-4 each illustrate a general sequence that respectively implements at least one embodiment of the method 200 for intelligent network selection as performed by the subscriber unit 110. FIG. 3 is a sequence diagram showing an illustrative method for intelligent network, in accordance with an embodiment, where an interoperability gateway collects network state condition information for use in selecting an optimal access network for attachment thereto of a subscriber unit. FIG. 4 is a sequence diagram showing an illustrative method for intelligent selection, in accordance with an embodiment, where a subscriber unit collects network state condition information for use in selecting an optimal access network for attachment thereto of the subscriber unit.

The communication system provided in FIGS. 3-4 is similar to the communication system 100 of FIG. 1. Illustratively, in the context of a Public Safety LTE system, the communication system provided in FIGS. 3-4 generally includes at least one subscriber unit or "responder device" 301, 401, an active access network or "home public safety LTE (PS LTE)" 304, 404 to which the responder device is currently attached, a dedicated Evolved Packet System bearer manager of the active access network (Home PS LTE EPS) 305, 405 to provide a default bearer during attachment for always-on Internet Protocol connectivity, an interoperability gateway as illustratively applied to public safety (PSIG or Public Safety Interoperability Gateway) 306, 406, a neighboring LTE radio access network or "neighboring PS LTE" 303, 403 radio access network, and a neighboring public LTE radio access network or a neighboring commercial "carrier LTE" 302, 402 radio access network.

Turning now to FIG. 3, at 310, the subscriber unit 301 attaches to and authenticates with the active access network 304 as well as registers, at 315, with the interoperability gateway 306. Illustratively, at 320, the responder device 310 is triggered by a dwindling Received Signal Strength (RSS) at a channel at the active access network 304 to consider, at 330, a neighboring network 303 as target networks for subsequent attachment thereto.

The interoperability gateway 306 collects network state condition information for at least one target neighboring network 302, 303 and generates a report for each target neighboring network 302, 303 based on the network state condition information, which is provided to the responder device 301, at 340. Illustratively, at 345, the responder device 301 determines from the report that the corresponding target neighboring network 303, "neighboring PS LTE" radio access network, is congested which would further inhibit subscriber unit's 301 operability if attachment were to occur. As such, the responder device 301 at 350 considers the target neighboring network 302, a commercial "carrier LTE" radio access network.

The responder device 301 at 355 determines from the report that the target neighboring network 302 presently has optimal conditions for attachment of the subscriber unit 110. Thereafter, the subscriber unit 110 at 360 initiates detachment from network 304 and successfully completes attachment and authentication to the selected network 302. Moreover, at 370, the subscriber unit 110 activates a default Evolved Packet System bearer during attachment for always-on Internet Protocol connectivity.

FIG. 4 illustrates a sequence for intelligent network selection 400 where a subscriber unit collects network state condition information for use in selecting an optimal access network for attachment thereto of the subscriber unit. At 410, the subscriber unit 401 attaches and authenticates with the active access network 404 and, at 415, registers with an interoperability gateway 406 that sits above a network layer including the active access network 404. Illustratively, at 420, a dwindling Received Signal Strength (RSS) for the active access network 404 is detected, at 430, a target network 403 for subsequent attachment thereto is selected.

At 440, the subscriber unit 110 within the active access network 404 collects network state condition information for the target neighboring network 403 and generates a report for the target neighboring network 403. Illustratively, at 445, the subscriber unit determines from the report that the corresponding target neighboring network 403, "neighboring PS LTE" radio access network, is congested which would further inhibit the subscriber unit's 401 operability if attachment were to occur. As such, the subscriber unit at 450 considers the target neighboring network 402, a commercial "carrier LTE" radio access network.

The subscriber unit at 455 determines from the report that the target neighboring network 402 presently has optimal conditions for attachment of the subscriber unit 410. Thereafter, the subscriber unit 110 at 460 initiates and successfully completes attachment and authentication. Moreover, at 470, the subscriber unit 110 activates a default Evolved Packet System bearer during attachment for always-on Internet Protocol connectivity.

FIG. 5 is a flow diagram illustrating a method 500 performed by an infrastructure device for intelligent network selection from a plurality of networks, in accordance with an embodiment. In an embodiment, the infrastructure device is the interoperability gateway 150. Accordingly, as shown in FIG. 1, the infrastructure device (150) is coupled to a plurality of networks 128. At 502, the infrastructure device collects network state condition information from the plurality of networks. In one embodiment, network state condition information includes at least one of the following: administrative status, operational status, usage status, or admission priority.

The infrastructure device, at 504, receives a request for selecting a second access network from the plurality of networks from a subscriber unit (110) that is attached to a first access network (120) of the plurality of networks (128). At 506, the infrastructure device selects the second access network using the collected network state condition information and, at 508, the infrastructure device provides the subscriber unit with the selected access network to initiate detachment, of the subscriber unit, from the active network and attachment to the selected network In one embodiment, selecting the second access network includes at least a similar process as was described by references to blocks 206-21 of FIG. 2 for the subscriber unit. Accordingly, the infrastructure device select a preferred target network from the plurality networks, for example based on a list of preferred networks provided by the subscriber unit. The infrastructure device analyzes the network state condition information for the preferred network. When the network state condition information for the preferred network satisfies minimum attachment criteria for the subscriber unit, the infrastructure device selects the preferred network as the second access network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for intelligent network selection from a plurality of networks, the method comprising:
   a subscriber unit operating while attached to a first access network from the plurality of networks, the subscriber unit performing while attached to the first access network:
   receiving network state condition information for a set of target networks from the plurality of networks, wherein the network state condition information comprises at least one of administrative status and operational status, wherein administrative status is a status or indication of whether a network is locked or unlocked, and wherein operational status is a status or indication of whether an element of a network is enabled or disabled;
   receiving a trigger for selecting a second access network from the plurality of networks; selecting the second access network using the network state condition information; and detaching from the first access network and attaching to the second access network.

2. The method of claim 1, wherein the network state condition information is received from an infrastructure device that collects the network state condition information from the set of target networks.

3. The method of claim 2, wherein the network state condition information is received upon request by the subscriber unit.

4. The method of claim 3, wherein the subscriber unit requests the network state condition information upon receiving the trigger for selecting the second access network.

5. The method of claim 3, wherein the subscriber unit periodically requests the network state condition information.

6. The method of claim 2, wherein the network state condition information is periodically pushed to the subscriber unit.

7. The method of claim 1, wherein receiving the network state condition information comprises the subscriber unit collecting the network state condition information from the set of target networks.

8. The method of claim 7, wherein the network state condition information is collected from advertisement messages broadcasted by each of the target networks in the set.

9. The method of claim 1 wherein the trigger comprises detecting a change in signal strength for the first access network.

10. The method of claim 1, wherein selecting the second access network comprises:
    selecting a first target network of the set of target networks;
    analyzing the network state condition information for the first target network;
    when the network state condition information for the first target network satisfies minimum attachment criteria for the subscriber unit, selecting the first target network as the second access network.

11. The method of claim 10, wherein the first target network is selected from a list of preferred access networks stored in the subscriber unit.

12. The method of claim 1 wherein the trigger comprises a change in service costs.

13. The method of claim 1 wherein the trigger comprises a reduction in or loss of resources on the first access network.

14. The method of claim 1 wherein the trigger comprises a change in security parameters.

15. A method for intelligent network selection from a plurality of networks, the method comprising:
    an infrastructure device coupled to the plurality of networks, the infrastructure device performing:
    collecting network state condition information from the plurality of networks, wherein the network state condition information comprises at least one of administrative status and operational status, wherein administrative status is a status or indication of whether a network is locked or unlocked, and wherein operational status is a status or indication of whether an element of a network is enabled or disabled;
    receiving, from a subscriber unit that is attached to a first access network of the plurality of networks, a request for selecting a second access network from the plurality of networks;
    selecting the second access network using the collected network state condition information; and
    initiating detachment of the subscriber unit from the first access network and attachment of the subscriber unit to the second access network.

16. The method of claim 15, wherein selecting the second access network comprises:
    selecting a first preferred network from the plurality networks;
    analyzing the network state condition information for the first preferred network;
    when the network state condition information for the first preferred network satisfies minimum attachment criteria for the subscriber unit, selecting the first preferred network as the second access network.

17. The method of claim 15, wherein the infrastructure device is layered to sit above a network layer.

18. The method of claim 15, wherein the infrastructure device is layered to sit above the core networks associated with the first access network and the second access network.

* * * * *